UNITED STATES PATENT OFFICE.

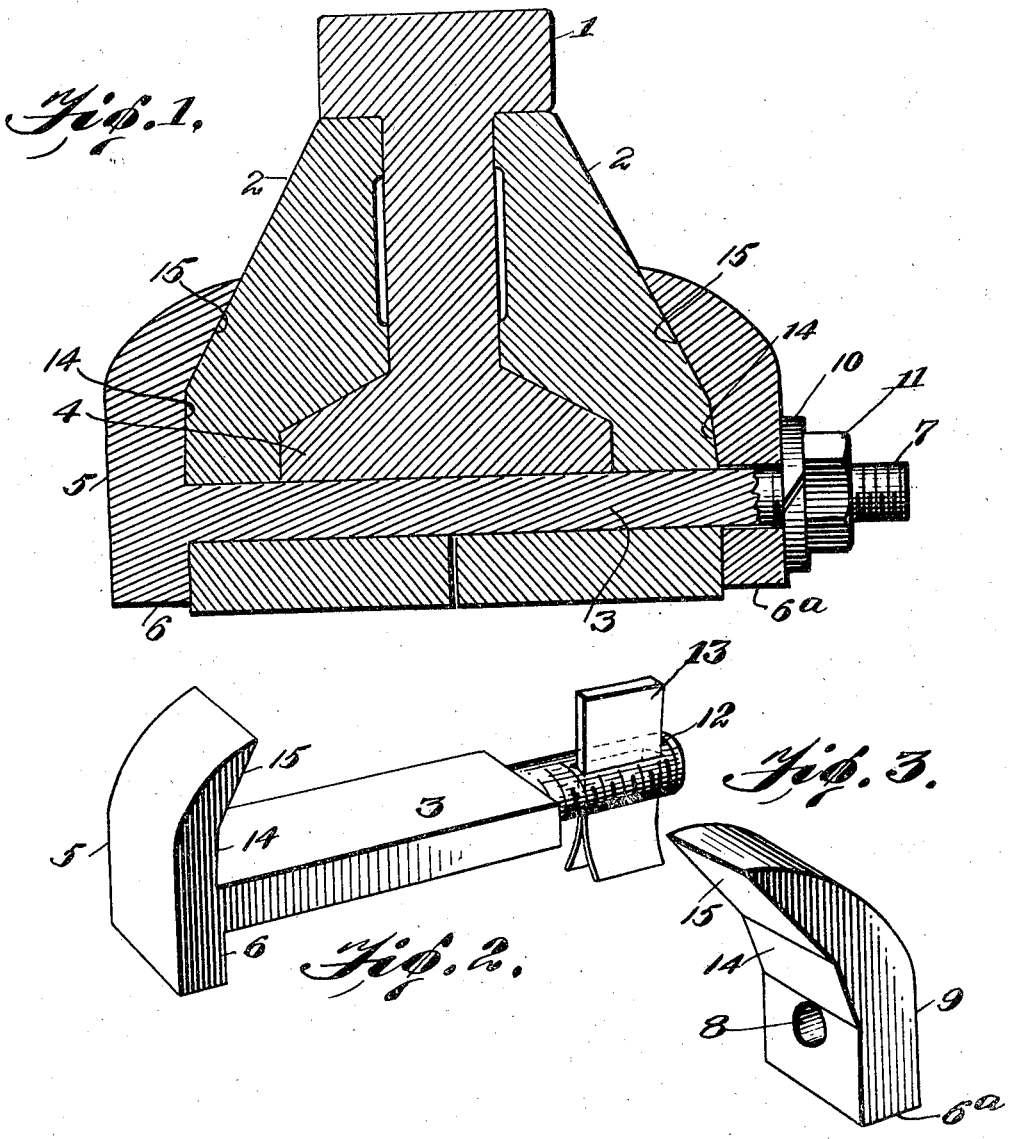

JOHN HOPKINS HARNSBERGER, OF CATLETT, VIRGINIA.

RAIL-JOINT-COUPLING DEVICE.

1,353,653.

Specification of Letters Patent. Patented Sept. 21, 1920.

Application filed May 25, 1920. Serial No. 384,084.

*To all whom it may concern:*

Be it known that I, JOHN H. HARNSBERGER, citizen of the United States, residing at Catlett, in the county of Fauquier and State of Virginia, have invented certain new and useful Improvements in Rail-Joint-Coupling Devices, of which the following is a specification, reference being had therein to the accompanying drawings.

This invention relates to a rail joint coupling device, and more particularly to an improvement upon the structure disclosed in Lyle M. Smith's United States Patent, No. 1,325,267, relating to rail joint coupling devices, issued December 16, 1919.

The object of the invention is the construction of a simple and an efficient rail joint coupling device, embodying a simple fastening device that can be used in a smaller space that the fastening device or means disclosed in said Smith's United States patent.

With this and other objects in view, my invention comprises certain novel combinations, constructions and arrangements of parts as will be hereinafter described, illustrated in the accompanying drawings, and more particularly pointed out in the appended claims.

In the drawings:

Figure 1 is a transverse sectional view of a device constructed in accordance with the present invention.

Fig. 2 is a perspective view of another embodiment of the fastening device, showing particularly an elongated slot, for a wedge, in the threaded end thereof.

Fig. 3 is a perspective view of the detachable clamping plate of the fastening device.

Referring to the drawings by numerals, 1 designates an ordinary rail positioned against which are the angle or fish plates 2.

My fastening device comprises a flat, elongated body 3 that extends through suitable elongated apertures in the fish plates 2 and under the base 4 of the rail 1, Fig. 1. Integral with one end of the body 3 is a clamping plate 5, that is provided with a depending flange portion 6, extending below the lower face of the body 3, to strengthen the fastening device and give a greater bearing surface against the side of the engaged angle or fish plate 2. Integral with the other end of the body 3 is a reduced threaded portion 7; this threaded portion 7 extends through the horizontal aperture 8 of the detachable clamping plate 9, and against the outer face of the plate 9 is positioned a split washer 10, and threaded on the threaded portion 7, against the outer face of the washer, is a nut 11; this nut 11 will require a smaller space than a wedge 13, shown in Fig. 2.

Each of the clamping plates 5 and 9 is provided with a primary inclined face 14 and with an auxiliary inclined face 15, engaging the corresponding inclined outer faces or portions of the angle or fish plates. As the nut 11 or the wedge 13 is tightened upon the threaded portion 7 of the fastening device, the beveled or inclined faces 14 and 15 of the clamping plates will more tightly bind against the sides of the fish plates 2, causing the fish plates to be forced tightly and securely against the abutting faces of the rail 1, thereby producing a very efficient fastening device for securing the fish plates upon a rail or rails, preferably at a joint or where two contiguous ends of rails abut.

It is to be noted that the aperture 8 is formed in the lower portion of the detachable clamping plate 9, and that this plate 9 extends below, at 6ª, the lower face of the body 3 of the fastening device in the same manner as the depending portion 6 of the fixed clamping plate 5.

The advantage of the double, inner, inclined portions 14 and 15 resides in the fact that even if the fish plates 2 are not at first tight against the sides of the rail, these inclined faces, by the tightening of the nut 11, will ride snugly against the sides of the fish plates, causing the fish plates to be forced in a very tight position against the web and tread of the rail, Fig. 1.

While I have described the preferred embodiment of my invention, and have illustrated the same in the accompanying drawings, certain minor changes or alterations may appear to one skilled in the art to which this invention relates, during the extensive manufacture of the same and I, therefore, reserve the right to make such alterations or changes as shall fairly fall within the scope of the appended claims.

What I claim is:

1. In a device of the class described, the combination with a rail, a pair of fish plates positioned against the rail, of a fastening device extending through the sides of the fish plates and under the rail, said fastening device comprising a flat elongated body, said body provided at one end with a vertical clamping plate and at its other end with a reduced threaded extension, a detachable clamping plate on said threaded extension, said clamping plates provided with portions extending below the lower face of the flat elongated body and bearing against portions of the fish plates, said plates provided on their inner faces with primary and auxiliary beveled portions, said fish plates provided with beveled portions on their outer faces engaging the primary and auxiliary beveled portions of the plates, and means engaging the reduced threaded extension of the body for securely clamping the clamping plates upon the fish plates and the fish plates against the rail, substantially as shown and described.

2. In a device of the class described, the combination with a rail, of a pair of fish plates engaging said rail, each of said fish plates provided with double beveled outer face portions, a fastening device extending under the rail and through the sides of the fish plates, said fastening device including a fixed and a detachable clamping plate, said clamping plates provided with double beveled inner faces or portions engaging the similar outer face portions of the fish plates, and means on said fastening device for securely clamping the clamping plates against the fish plates.

3. In a device of the class described, the combination with a rail, a pair of fish plates engaging said rail, of a fastening device under the rail and extending through the sides of the fish plates, said fastening device comprising a flat elongated body having at one end an integral clamping plate, said clamping plate extending above and below the body, said body provided with a reduced extension, a detachable clamping plate on said reduced extension and extending above and below the body, and means on the extension for tightly clamping or holding the clamping plates against the sides of the fish plates both above and below the body of the fastening device, substantially as shown and described.

In testimony whereof I hereunto affix my signature.

JOHN HOPKINS HARNSBERGER.